(12) United States Patent  
Wolff et al.

(10) Patent No.: US 7,826,725 B2
(45) Date of Patent: Nov. 2, 2010

(54) WATER LEVEL SENSOR FOR STEAM HUMIDIFIER

(75) Inventors: Steven L. Wolff, Corcoran, MN (US); Brad A. Terlson, Maple Grove, MN (US); Tracy L. Lentz, Minneapolis, MN (US); Josef Novotny, Kuncina (CZ); Peter Bernat, Bratislava (SK)

(73) Assignee: Honeywell International Inc., Morristown, NJ (US)

( * ) Notice: Subject to any disclaimer, the term of this patent is extended or adjusted under 35 U.S.C. 154(b) by 392 days.

(21) Appl. No.: 11/874,623

(22) Filed: Oct. 18, 2007

(65) Prior Publication Data

US 2009/0103904 A1 Apr. 23, 2009

(51) Int. Cl.
*F24H 6/00* (2006.01)

(52) U.S. Cl. .................. 392/402; 392/337; 392/338

(58) Field of Classification Search .................. None
See application file for complete search history.

(56) References Cited

U.S. PATENT DOCUMENTS

| 1,994,331 | A | * | 3/1935 | Zeve et al. | 392/333 |
|---|---|---|---|---|---|
| 2,140,516 | A | * | 12/1938 | Cowan | 392/336 |
| 2,519,515 | A | * | 8/1950 | Turner | 392/324 |
| 2,533,794 | A | * | 12/1950 | Hanks et al. | 392/336 |
| 2,777,935 | A | * | 1/1957 | Schmitt et al. | 392/337 |
| 3,365,181 | A | * | 1/1968 | Schwaneke | 261/130 |
| 3,809,374 | A | * | 5/1974 | Schossow | 261/130 |
| 3,892,945 | A | * | 7/1975 | Lerner | 219/437 |
| 4,028,526 | A | * | 6/1977 | Schossow | 392/337 |
| 4,155,001 | A | * | 5/1979 | Schossow | 392/337 |
| 4,169,261 | A | * | 9/1979 | Alpaugh | 340/602 |
| 5,079,950 | A | * | 1/1992 | McKiernan et al. | 73/313 |
| 5,294,917 | A | * | 3/1994 | Wilkins | 340/625 |
| 5,546,926 | A | * | 8/1996 | Lake | 126/113 |
| 6,195,013 | B1 | * | 2/2001 | Robinson | 340/623 |
| 6,715,743 | B2 | * | 4/2004 | Zhang | 261/130 |

(Continued)

OTHER PUBLICATIONS

Omega Engineering, Inc., "Conductivity Level Switches," www.omega.com, Unknown, K-45 to K-48.
Standex Electronics, "Fluid Level, Proximity and Motion Sensors," www.standexelectronics.com, Unknown, pp. 1-16.
Standex Electronics, "LS100 Series—Conductive Fluid Level Sensor," www.standexelectronics.com, Unknown, 1 pg.
Standex Electronics, "LS300 Series—Conductive Fluid Level Sensor," www.standexelectronics.com, Unknown, pp. 1-2.

*Primary Examiner*—Thor S Campbell
(74) *Attorney, Agent, or Firm*—Crompton Seager & Tufte LLC

(57) ABSTRACT

A water level sensor for a steam humidifier. The water level sensor includes a plurality of conductive probes, where the plurality of conductive probes includes at least one common probe and a plurality of water level probes. Each of the conductive probes are separated from each other conductive probe. The water level sensor further includes a non-conductive overmolding covering at least a portion of each of the conductive probes. The non-conductive overmolding defines a flange configured to seal an opening in a tank of the steam humidifier and an electrical connection point configured to receive an electrical connector for providing electrical connections to each of the conductive probes. A steam humidifier is also disclosed.

23 Claims, 9 Drawing Sheets

U.S. PATENT DOCUMENTS

| | | |
|---|---|---|
| 6,727,822 B2 | 4/2004 | Chamberlin et al. |
| 6,810,732 B2 * | 11/2004 | Shon ........................ 73/304 R |
| 7,389,688 B1 * | 6/2008 | Vander Horst ............ 73/290 R |
| 7,623,771 B2 * | 11/2009 | Lentz et al. .................. 392/386 |
| 2003/0010117 A1 * | 1/2003 | Shon ........................ 73/304 R |
| 2008/0185742 A1 * | 8/2008 | Novotny et al. ............. 261/118 |

\* cited by examiner

WATER LEVEL SENSOR FOR STEAM HUMIDIFIER

FIELD OF THE INVENTION

The invention relates to steam humidifiers, and more particularly, to constructions for sensing water level in a tank of a steam humidifier.

BACKGROUND OF THE INVENTION

The interior spaces of buildings are often at a lower than desired level of humidity. This situation occurs commonly in arid climates and during the heating season in cold climates. There are also instances in which special requirements exist for the humidity of interior spaces, such as in an art gallery or where other delicate items are stored, where it is desired that the interior humidity levels be increased above naturally occurring levels. Therefore, humidifier systems are often installed in buildings to increase the humidity of an interior space.

Humidification systems may take the form of free-standing units located within individual rooms of a building. More preferably, humidification systems are used with building heating, ventilation, and air conditioning (HVAC) systems to increase the humidity of air within ducts that is being supplied to interior building spaces. In this way, humidity can be added to the air stream at a centralized location, as opposed to having multiple devices that increase humidity at multiple points within the building interior. Additionally, because the air within ducts may be warmer than the interior space air during a heating cycle, the additional air temperature can help prevent water vapor from condensing in the vicinity of the humidifier, such as on the inside of the duct.

An issue associated with humidification system is that they should only discharge water vapor into a duct and not liquid water. Liquid water within a duct can create a number of serious problems. For example, liquid water that remains stagnant within a duct can promote the growth of mold or organisms that can release harmful substances into the air flow, potentially causing unhealthy conditions in the building. Liquid water can also cause rusting of a duct which can lead to duct failure, and can create leaks from the duct to the building interior spaces which are unsightly, can cause a slipping hazard, and can lead to water damage to the structure.

One known humidification method involves direct steam injection into an air duct of a building. This approach is most commonly used in commercial buildings where a steam boiler is present to provide a ready supply of pressurized steam. Steam humidification has the advantage of having a relatively low risk of liquid moisture entering a duct or other building space. However, pressurized steam injection systems are associated with a risk of explosion of the steam pressure vessels, as well as a risk of possibly burning nearby people, both of which are very serious safety concerns. In residential applications, there are usually no readily available sources of pressurized steam. An open bath humidifier system may be used, however these are difficult to install because they require a large hole in the duct and can only be used with horizontal or upflow ducts. Alternatively, a residential application may use direct steam injection, but this requires a separate unit to generate pressurized steam and this separate unit is costly. Moreover, the system would suffer from the same disadvantages as are present in commercial direct steam injection systems.

One type of humidifier that is commonly used in residential applications that has the advantages of steam humidification without the need for a separate source of pressurized steam is a tank heater type humidifier. In this type of humidifier, heat is generated within a tank of water, causing the water to boil and steam to be generated. The heat input may be any of a number of different sources, however, commonly an electrical heating element is used.

Improved constructions for humidification systems are desired. In particular, improved constructions for sensing water level in a tank of a steam humidifier are needed.

SUMMARY OF THE INVENTION

One aspect of the invention relates to a water level sensor for a steam humidifier. The water level sensor includes a plurality of conductive probes, where the plurality of conductive probes includes at least one common probe and a plurality of water level probes. Each of the conductive probes are separated from each other conductive probe. The water level sensor further includes a non-conductive overmolding covering at least a portion of each of the conductive probes. The non-conductive overmolding defines a flange configured to seal an opening in a tank of the steam humidifier and an electrical connection point configured to receive an electrical connector for providing electrical connections to each of the conductive probes.

Another aspect of the invention relates to a steam humidifier. The steam humidifier includes a tank for containing water and a heating element for heating water in the tank to generate steam, the tank including a main chamber and an isolated chamber in communication with the main chamber. The steam humidifier further includes a water level sensor having a plurality of conductive probes positioned in the isolated chamber. The water level sensor includes a plurality of conductive probes, where the plurality of conductive probes include at least one common probe and a plurality of water level probes. Each of the conductive probes is separated from each other conductive probe. The water level sensor further includes a non-conductive overmolding covering at least a portion of each of the conductive probes, where the non-conductive overmolding defines a flange configured to seal an opening in a tank of the steam humidifier and an electrical connection point configured to receive an electrical connector for providing electrical connections to each of the conductive probes. The steam humidifier further includes a seal between the flange of the water level sensor and the tank and a retainer configured to force the flange against the seal.

The invention may be more completely understood by considering the detailed description of various embodiments of the invention that follows in connection with the accompanying drawings.

Figure 1:
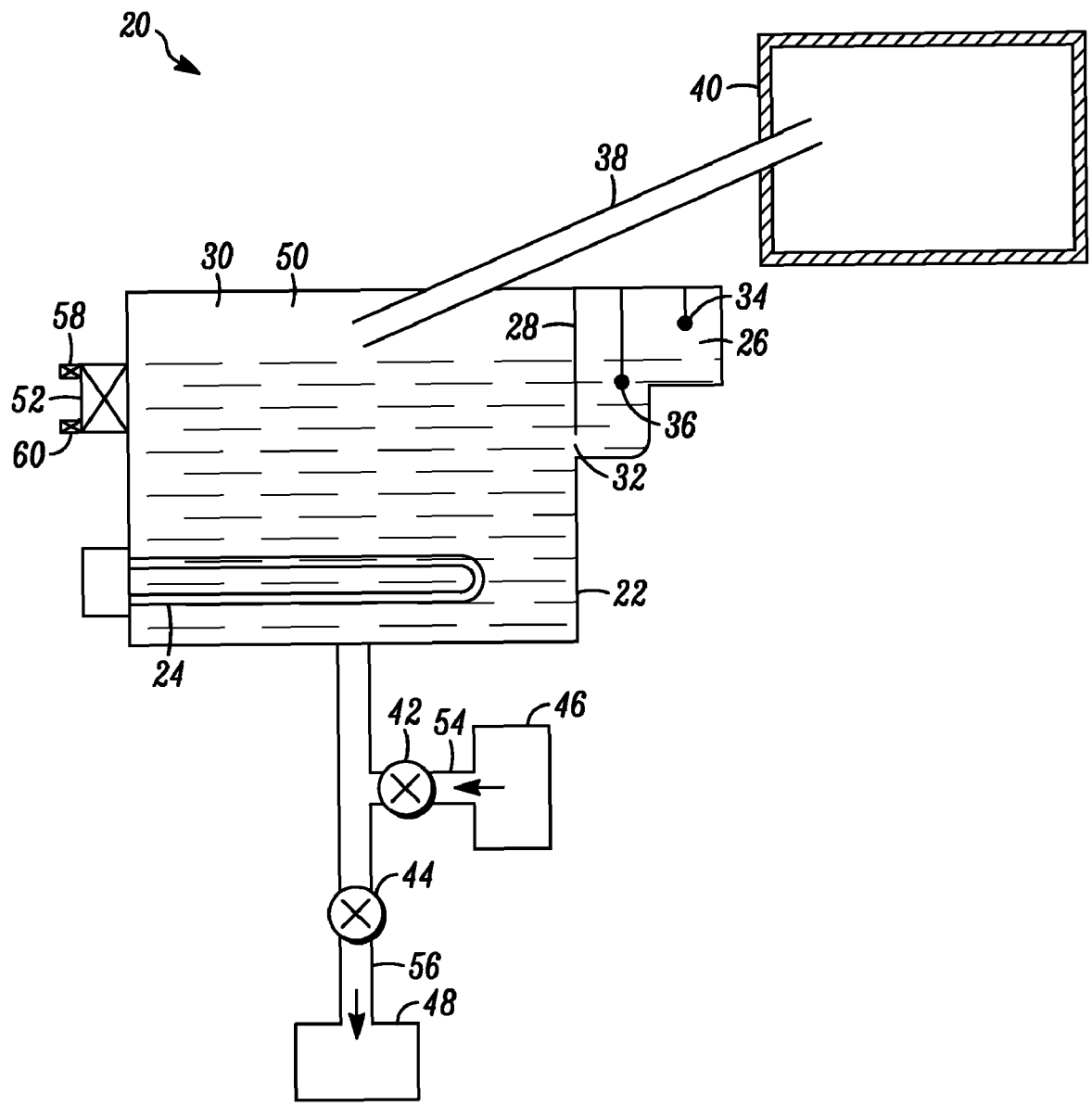
FIG. 1 is a cross-sectional view of a tank heater type steam humidifier.

While the invention may be modified in many ways, specifics have been shown by way of example in the drawings and will be described in detail. It should be understood, however, that the intention is not to limit the invention to the particular embodiments described. On the contrary, the intention is to cover all modifications, equivalents, and alternatives following within the scope and spirit of the invention as defined by the claims.

DETAILED DESCRIPTION OF THE INVENTION

The present invention is applicable to water level sensors for steam humidifiers, and more particularly tank heater type humidifiers. Water level sensors of this type are particularly useful in the context of tank heater type humidifiers capable of sensing at least two different water levels.

In a tank heater type humidifier, heat is generated within a tank of water, causing the water to boil and steam to be generated. The tank of the tank heater type humidifier needs to be filled with water, and as steam is generated, the water that is boiled off needs to be replaced. In order to properly control the filling of the tank, it is necessary to sense the water level in the tank. A variety of water level sensors exist. For example, float sensors are used in some humidifiers. However, water level sensors are preferably highly reliable, because a failure of a water level sensor can cause overfilling or under-filling of a tank, leading to failures of the humidifier. Furthermore, a water level sensor must be robustly and reliably sealed against the water and steam that is present in the tank, because water leaks can lead to water damage of the building structure or damage to the electronics or other features of the humidifier. Furthermore, it is important that a water level sensor perform these functions while still being inexpensive to manufacture and assemble. The water level sensor of the present invention is an advantageous construction over existing water level sensors for humidifiers.

An embodiment of a tank heater type humidifier is depicted schematically in FIG. 1. Humidifier 20 includes a tank 22 configured to retain a volume of liquid water. Tank 22 is generally constructed out of material that is sufficiently resistant to high temperatures, such as the temperature of boiling water. Examples of suitable materials for tank 22 are temperature resistant plastics, examples of which are a thermoplastic resin such as a polyphenylene ether/polystyrene blend, and stainless steel. A heating coil 24 is also provided to heat water within tank 22. Heating coil 24 is generally an electric heating coil that generates heat when an electric current is passed through a resistive material. However, other types of heating coils 24 are usable. For example, heating coil 24 could pass a heated material such as a heated liquid through a tube that allows heat to transfer to the liquid in the tank 22. Furthermore, a heater may be substituted for heating coil 24, where a heater is of a conventional liquid heating design, such as a propane or natural gas liquid heater or a fuel oil burner.

Tank 22 is shown in FIG. 1 as having an isolated chamber 26 that is separated from a main chamber 30 of tank 22 by baffle 28. Isolated chamber 26 is in fluid communication with main chamber 30 by way of opening 32 which allows liquid from main chamber 30 to flow into isolated chamber 26 and to reach the same fluid level as in main chamber 30. Isolated chamber 26 tends, however, to be insulated from ripples, bubbles, and other fluctuations of the water level in main chamber 30, and therefore is a suitable location for measuring the water level in tank 22. FIG. 1 also shows that a high level water sensor 34 and a low level water sensor 36 are present within isolated chamber 26. Sensor 36 detects the presence of water at a first relatively level and sensor 34 detects the presence of water at a second relatively high level, where the first level is lower than the second level. Each of sensors 34, 36 is configured to detect the presence of water at the particular sensor. Sensors 34, 36 may be a current-detection type of sensor, where a source of current such as alternating current is applied at a point in the tank that is below both sensors 34, 36 and where sensors 34, 36 are configured to detect the presence of current which indicates a current path from the source of current, through the water, to sensors 34, 36. The details of the construction of sensors 34, 36 are discussed below. Humidifier 20 further includes a tube 38 that projects from main tank chamber 30 to the interior of an air duct 40 and that provides a fluid connection for the flow of steam from main tank chamber 30 to the interior of air duct 40.

Humidifier 20 includes a fill valve 42 and a drain valve 44. Fill valve 42 is in fluid communication through conduit 54 with a water supply 46, such as a municipal water supply system or a well pump system. Drain valve 44 is in fluid communication through a conduit 56 with a water receiving system 48, such as a municipal water treatment system, a septic system, or a drain field. Humidifier 20 further includes a controller 52 that is in communication with water level sensors 34, 36 and has the ability to control the fill and drain valves 42, 44. Controller 52 also includes one or more timers configured to measure elapsed times.

Figure 2:
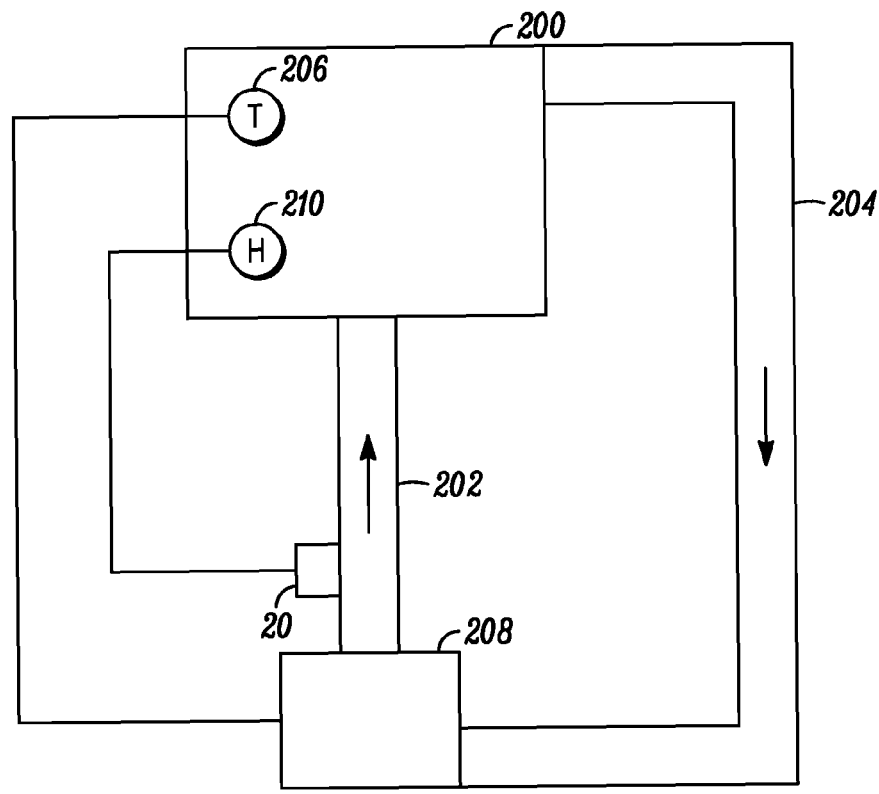
FIG. 2 is a schematic representation of a HVAC system having a humidifier.

A typical heating, ventilation, and air conditioning (HVAC) installation that includes a humidifier is depicted in FIG. 2. Conditioned space 200 of a building is configured to receive conditioned air from supply duct 202 and to provide for return air flow through return duct 204. Conditioned space 200 includes at least one thermostat 206 that is in communication with conditioning device 208. Conditioning device 208 may be a furnace, a boiler, an air conditioner, a heat exchanger, or a combination thereof, that is configured to condition return air from return duct 204 and deliver the conditioned air to supply duct 202. Conditioning air may involve increasing the temperature of the air, decreasing the temperature of the air, cleaning the air, or other such processes. Conditioning device 208 generally includes a fan or blower for drawing air from return duct 204 and delivering air through supply duct 202. Thermostat 206 senses the temperature in conditioned space 200 and activates conditioning device 208 when the temperature deviates from a set value. When conditioning device 208 is activated by a call for conditioning from thermostat 206, conditioned air is supplied through supply duct 202 to adjust the temperature of conditioned space 200 until the temperature sensed by thermostat 206 satisfies a set value. In some embodiments, thermostat 206 may be configured to receive an input to run a fan or blower without temperature conditioning of the air. In this case only the fan or blower portion of conditioning device 208 is activated and air is supplied through supply duct 202 without being conditioned by conditioning device 208.

FIG. 2 also shows a typical installation of humidifier 20. Humidifier 20 is installed on supply duct 202 downstream of conditioning device 208. A humidistat 210 is installed in conditioned space 200 or within return duct 204 and is in communication with humidifier 20. One embodiment of a humidistat 210 senses the relative humidity level (RH) present in conditioned space 200 and activates humidifier 20 when the humidity level falls below a set value. Other embodiments of humidistat 210 sense indoor dewpoint or even outdoor dewpoint in combination with either indoor RH or indoor dewpoint. In some embodiments, the thermostat 206 will incorporate the functionality of humidistat 210. When humidifier 20 is activated, humidity is added to conditioned air within supply duct 202 in order to increase the humidity in conditioned space 200. In some embodiments, humidifier 20 and/or humidistat 210 are configured to activate humidifier 20 only when conditioning device 208 is activated. This ensures that air is flowing through supply duct 202 to carry the additional humidity to conditioned space 200. If humidifier 20 is activated without air flowing in supply duct 202, the additional humidity provided by the humidifier may condense on the walls of the duct and cause damage, and the additional humidity will also not be effectively delivered to conditioned space 200. In other embodiments, the conditioning device 208 will be activated any time there is a demand for humidification from humidistat 210.

In operation of humidifier 20, when there is a call for humidification, humidifier 20 is filled by opening fill valve 42 to allow water from supply 46 to flow through conduit 54 into main chamber 30 of tank 22 and to isolated chamber 26. Fill valve 42 will remain open until water is detected at high water sensor 34, at which point fill valve 42 is closed. Heating coil 24 is then energized, causing the temperature of the water in tank 22 to increase in temperature. In some embodiments, water tank 22 is filled prior to there being a demand for humidification, such as at installation or system start-up, and then waits for a call for humidification to energize the heating coil 24. As the water in tank 22 is heated, the water in tank 22 will begin to boil and steam will form at the top 50 of tank 22. A very slight pressure will be established in the top area 50 of tank 22, driving steam through tube 38 and into duct 40. Tube 38 is configured to allow sufficient steam to flow into duct 40 that very little pressure will build in tank 22. In other embodiments, no pressure builds in tank 22 and steam is carried by convection into duct 40. The steam enters the air in duct 40 where it is carried to conditioned spaces within a building. As water is converted to steam, the water level in tank 22 will decrease. With sufficient operation, the water level will drop below the height of low water sensor 36. When water falls below the height of low level sensor 36, fill valve 42 will be opened and remain open until water reaches high level sensor 34.

Figure 3:
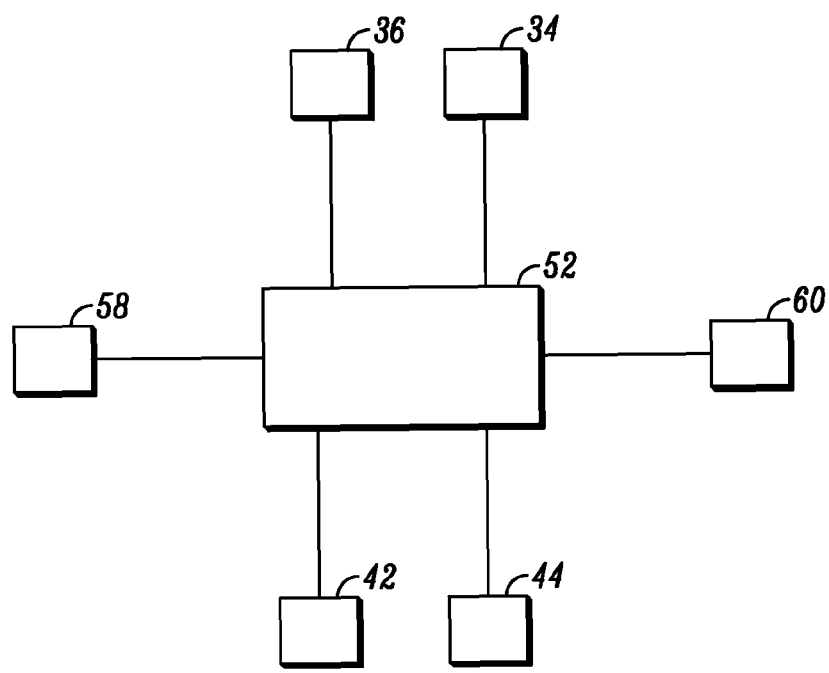
FIG. 3 is a schematic representation of a control system of a humidifier.

An embodiment of the components of a control system of humidifier 20 are depicted in FIG. 3. As shown in FIG. 3, controller 52 is in communication with high level sensor 34 and low level sensor 36. Controller 52 therefore receives signals representative of whether the water level in tank 22 is at or above low level sensor 36 and whether the water level in the tank 22 is at or above high level sensor 34. Controller 52 is further in communication with fill valve 42 and drain valve 44, and is able to control the operation of each. Controller 52 is also shown in FIG. 3 as being in communication with indicator 58. Indicator 58 may be used to communicate information to a user, such as the need to clean the tank. Controller 52 also has a switch or button 60 configured to receive input from a user, such as to indicate that the humidifier has been cleaned.

Figure 4:
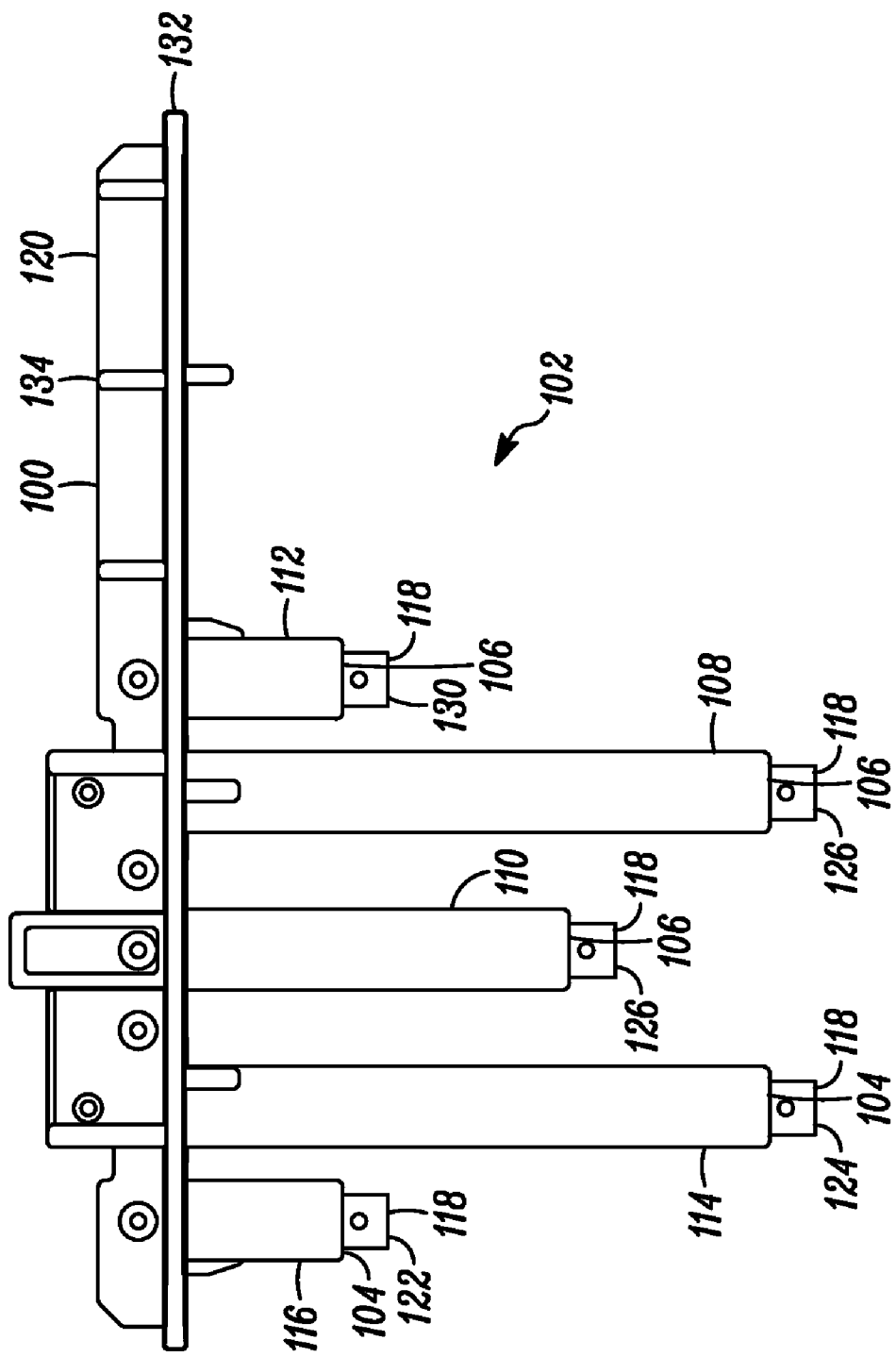
FIG. 4 is a side view of an embodiment of a water level sensor for a steam humidifier constructed according to the principles of the present invention.

An embodiment of a water level sensor constructed according to the principles of the present invention is depicted in FIG. 4. FIG. 4 is a side view of a water level sensor 100. Water level sensor 100 performs the functions of both low level sensor 36 and high level sensor 34. Water level sensor 100 functions on the principle that the liquid in the tank is water and that the conductivity of the water can be used to detect the water level. More specifically, water level sensor 100 is constructed to apply a small electrical potential to at least one underwater location within tank 22 and to detect the presence of that electrical potential at another location. When the detecting location is above the water in the tank, the very high resistance of the air in the tank will cause no or virtually no electrical potential to be detected at the detecting location. However, when the detecting location is at or below the water in the tank, the relatively high conductivity of the water will allow the electrical potential to be transmitted to the detecting location. When this electrical potential is received at the detecting location, less any losses associated with the resistance of the water, it can be determined that the water is at or above the level of the detecting location.

Implementing a water level sensor constructed in this fashion requires at least one probe called a common probe that applies an electrical potential to the water and a second probe called a water level probe that detects the presence of water at the detecting location. Having one common probe and one water level probe allows for the detection of one water level in the tank. However, as discussed above, it is desired to know at least two water levels within tank 22 of a humidifier. The first desired water level is a level that corresponds to a full tank of water, such that when water is at that level the inlet valve will be shut off to prevent additional filling. The second desired water level is a level that corresponds to a working low level, such as a level that is sufficient to ensure that the heating element remains submerged under water. The second water level could be positioned very close to the first water level, but this could cause very short cycle times between filling which would tend to cause greater numbers of openings and closings of the inlet valve, and in turn, greater wear of the inlet valve. In some cases, there is a third water level that is desirably sensed. This is an overfull water level that under normal operating conditions the water should never rise to. However, if a failure occurs in either the water sensing system or the water inlet system, the water in the tank could rise to the overfull level. In this case, if an overfull level sensor is provided, responsive actions can be initiated to prevent the tank from overfilling and spilling water into the duct or the building and possibly causing damage. However, in some embodiments, an overfull drain is provided so that water above the overfull level is able to flow to the drain. Regardless, it is desirable to be able to detect the overfull condition to be able to take responsive action such as closing the water inlet valve.

As seen in FIG. 4, water level sensor 100 includes a plurality of probes 102, which includes common probes 104 and water level probes 106. In the embodiment of FIG. 4, there are two common probes 104 and three water level probes 106. Greater numbers of probes are usable and may be selected based on the number of different water levels that are to be monitored. The three water level probes 106 of the embodiment of FIG. 4 correspond to a low water level sensor 108, high water level sensor 110, and overfull water level sensor 112. The water level measured by each of the water level probes is a function of the length of the probe, such that the lowest conductive surface of a probe operatively defines its effective water sensing depth. The two common probes 104 are standard common probe 114 and overfull common probe 116. Standard common probe 114 has an effective depth that is equal to or below the effective depth of low water level sensor 108.

Generally, overfull common probe 116 is not strictly necessary because overfull water level sensor 112 could detect current from standard common probe 114. However, in the event of the failure of the standard common probe 114, it is desired to have a backup common probe to be able to detect an overfull water condition. Since the water level sensor 100 relies on there being a conductive path between the common probe and the water, it is possible that sufficient deposits will form on the standard common probe 114 to prevent it from having an effective conductive interface with the water. By positioning overfull common probe 116 above high water level sensor 110, it will generally not be in contact with the water during normal operation and thereby is unlikely to develop an accumulation of deposits. Overfull common probe 116 may be located approximately at, or slightly below, overfull water level sensor 112. In this way, when water rises to the level of both overfull common probe 116 and overfull water level sensor 112, the overfull condition will be detected and responsive actions can be taken, the most likely being closing the inlet valve, opening a drain valve, or sounding an alarm.

Figure 5:
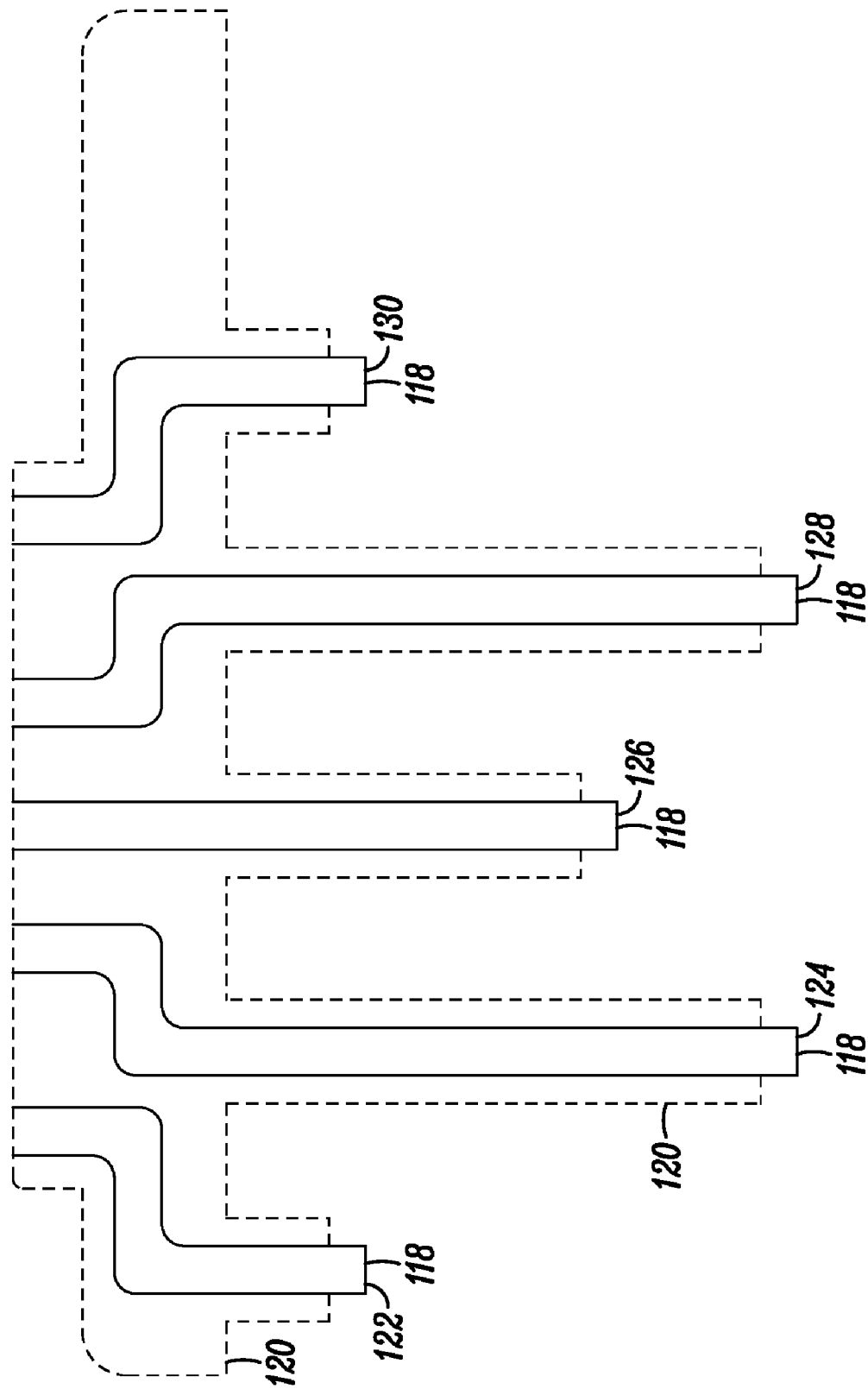
FIG. 5 is a layered view showing the internal construction of the water level sensor of FIG. 4.

Water level sensor 100 is generally formed from a series of electrically conductive elements and a nonconductive overmolding of plastic or other nonconductive material. The conductive elements are preferably constructed from a material having corrosion resistance, such as stainless steel or copper. The nonconductive overmolding is preferably a material suitably resistant to the temperature of boiling water and steam, such as a thermoplastic resin such as a polyphenylene ether/polystyrene blend. FIG. 5 illustrates how conductive elements 118 may be positioned within nonconductive material 120. Conductive elements 118 generally project a distance away from the nonconductive overmolding and thereby each conductive element 118 has a region of exposed conductive material that is capable of forming a conductive interface with water in tank 22 when the water is at an appropriate level. Conductive elements 118 are shown in FIG. 5 as solid lines and nonconductive material 120 is shown in dashed lines. As illustrated, conductive element 122 forms overfull common probe 116, conductive element 124 forms standard common probe 114, conductive element 126 forms high water level probe 110, conductive element 128 forms low water level probe 108, and conductive element 130 forms overfull water level probe 112. In some embodiments, conductive elements 118 extend less than about ⅛ of an inch beyond nonconductive overmolding. In some other embodiments, conductive elements 118 extend less than about ¼ of an inch beyond nonconductive overmolding. In some other embodiments, conductive elements 118 extend less than about ½ of an inch beyond nonconductive overmolding. In yet other embodiments, nonconductive overmolding covers more than about 75 percent of the portion of each conductive element that extends into tank 22. In further embodiments, nonconductive overmolding covers more than about 90 percent of the portion of each conductive element that extends into tank 22.

Each of the probes is preferably spaced away from other probes. In some embodiments, the probes are spaced apart by more than ⅛ inch. In some other embodiments, the probes are spaced apart by more than ¼ inch. In some other embodiments, the probes are spaced apart by more than ½ inch. It is possible if there is water spray or splash, water condensation, or an accumulation of deposits on the surfaces of the probes that a conductive path can be formed from one probe to another. If this occurs, and the water is also below the probe, the electrical potential from a common probe can be transmitted to a detecting probe, resulting in a falsely sensed water level. To minimize the occurrence of this phenomenon, it is desired that the probes be separated by a distance. The distance separating the probes is preferably as great as possible, but is also generally constrained by the desire to keep the water level sensor 100 reasonably compact. To help avoid falsely sensed water levels, water level sensor 100 has the probes 102 separated from each other and generally in line from each other so that a distance is maintained between each probe.

Furthermore, the non-conductive overmolding on the various probes also serves to minimize the risk of splashed or condensed water, or other deposits, forming a conductive path from one conductive element 118 to another. The greater the coverage of a conductive element 118 by a non-conductive overmolding, the greater the distance that would have to be covered by condensed or splashed water or other deposits to form a conductive path to another conductive element. In this way, the presence of non-conductive overmolding decreases the potential for false water level readings.

In one embodiment, water level sensor 100 is configured to be mounted to a top area of tank 22, such that probes 102 are generally vertical when the water level sensor 100 and tank 22 are in an operatively mounted configuration. However, in other embodiments, water level sensor 100 is configured to be mounted to a bottom area of tank 22, again with probes 102 located generally vertically. However, this arrangement is less advantageous because of the need to seal against the pressure generated by the weight of water in tank 22. In further embodiments, water level sensor 100 is configured to be mounted to a side area of tank 22, such that probes 102 are located generally horizontally when the tank 22 is in an operatively mounted configuration. In such a case, however, water level sensor 22 will also need to be configured to seal against the pressure of water in tank 22, although this pressure may be less than the pressure at the bottom of the tank.

Figure 6:
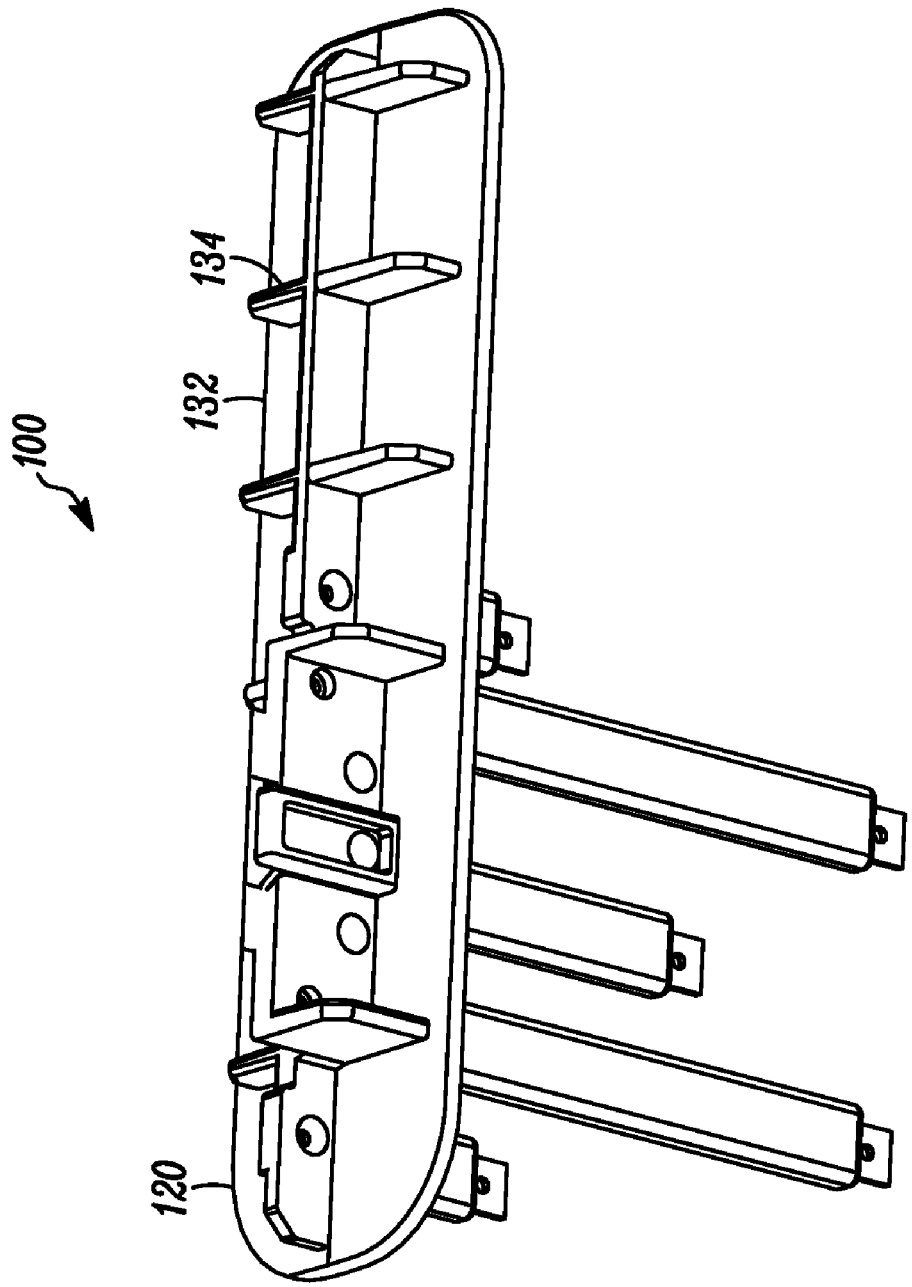
FIG. 6 is a top and side perspective view of the water level sensor of FIG. 4.

Water level sensor 100 is constructed as a single piece part that is configured to be received by a single opening in water tank 22. FIG. 6 is a top and side perspective view of water level sensor 100 showing the one piece construction. Non-conductive material 120 forms a flange 132 that provides support for probes 102 and that is configured to form a seal with tank 22. Flange 132 further includes reinforcing webs 134 that are configured to provide additional stiffness to flange 132 to minimize flexing of flange 132 in order to prevent breakage and to provide for a flat outer surface that is capable of forming an effective seal with tank 22.

Figure 7:
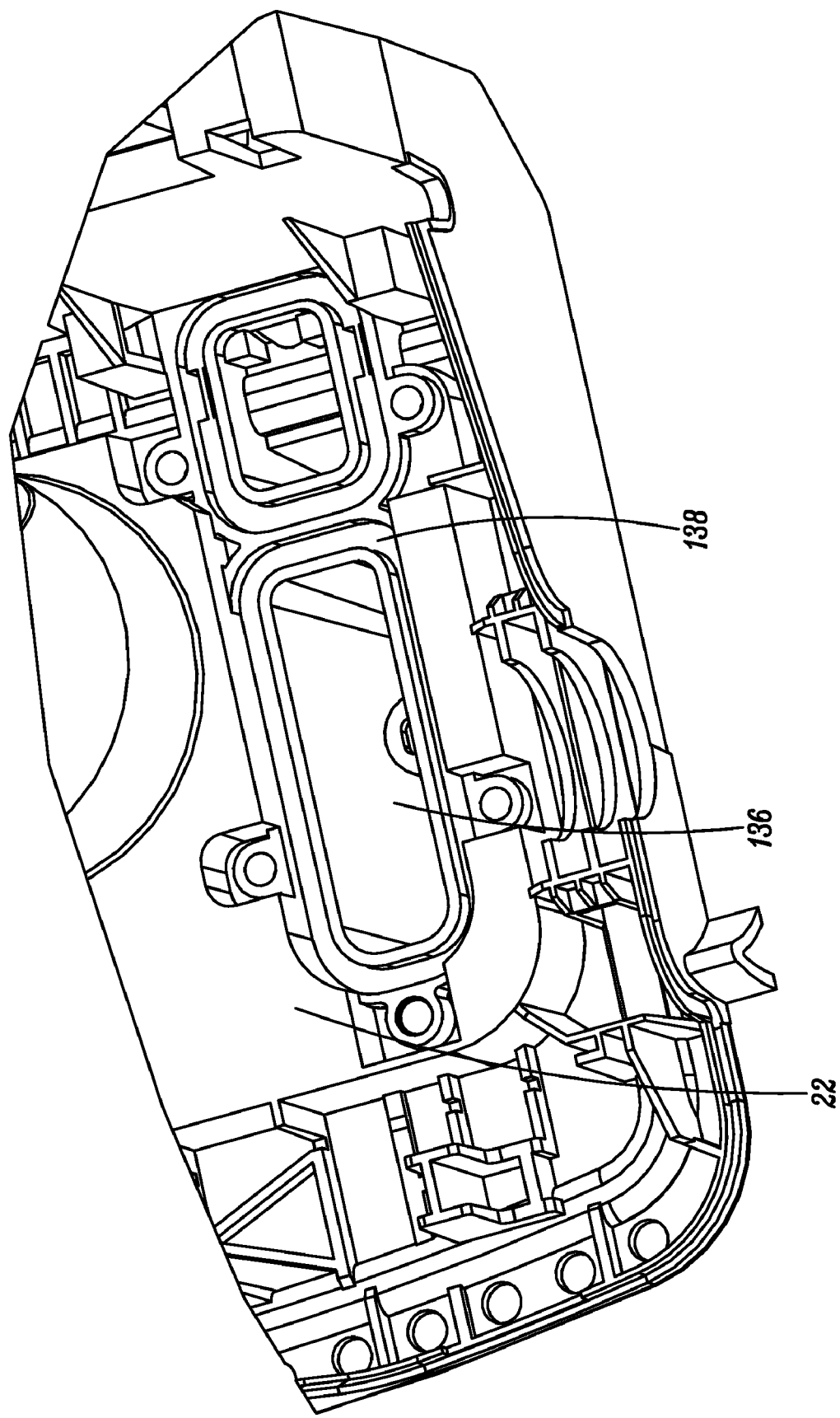
FIG. 7 is a perspective view of an opening in a tank of a steam humidifier configured to receive a water level sensor.
Figure 9:
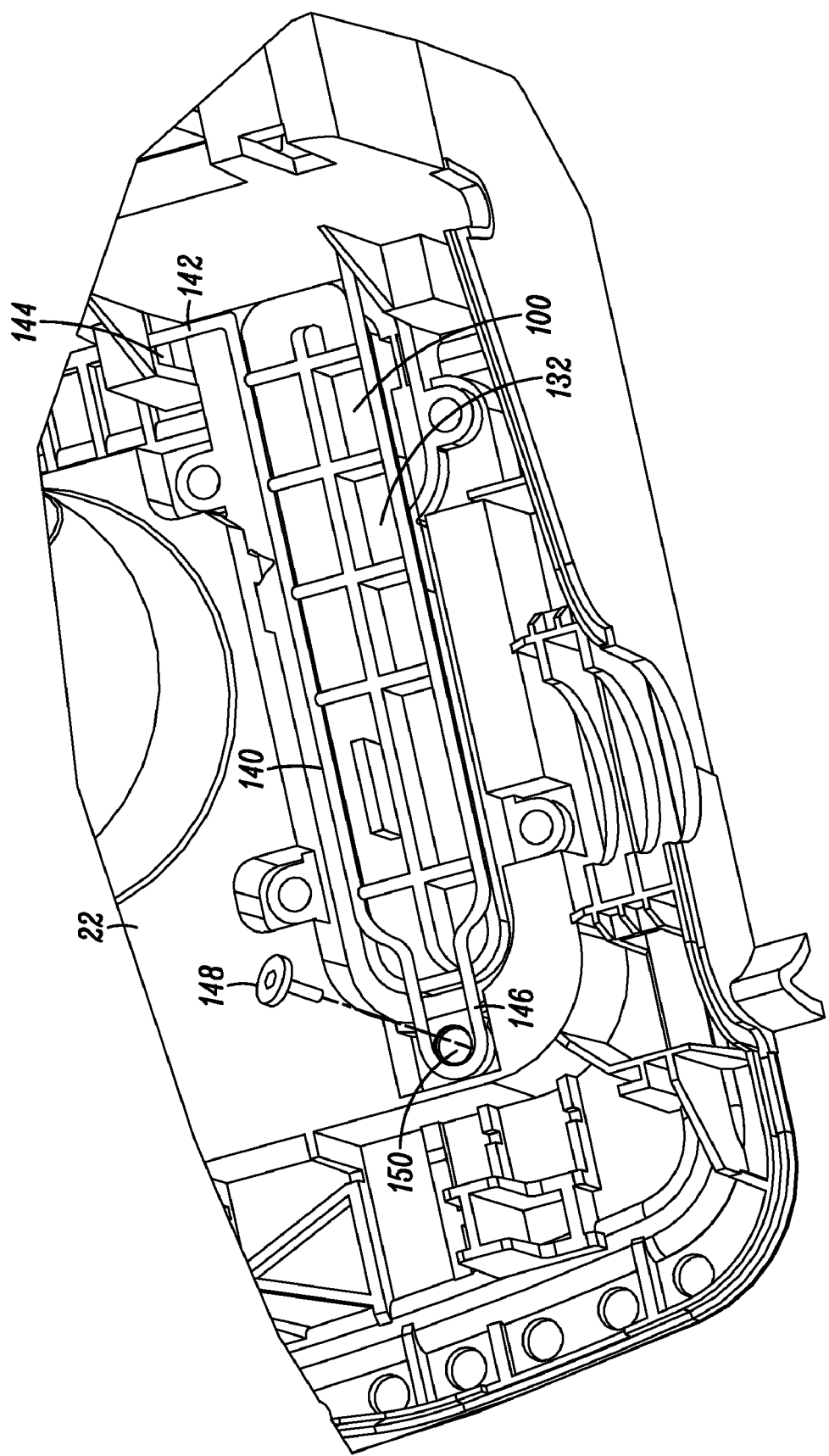
FIG. 9 is a perspective view of a water level sensor assembled to a tank and having a wire element to secure the water level sensor to the tank.

FIG. 7 is a top perspective view of a sensor receiving opening 136 in tank 22. Opening 136 is in communication with isolated chamber 26 (shown in FIG. 1). In one embodiment, opening 136 includes a perimeter seal groove 138 configured to receive a seal, such as an o-ring seal. When a seal is placed in perimeter seal groove 138, then as sensor 100 is inserted into opening 136, flange 132 will contact the seal. To form an effective seal, it is necessary to draw flange 132 against the seal. There are many ways to do this. One embodiment is shown in FIG. 9, where a compression element 140 is used to provide a force to flange 132. In the embodiment of FIG. 9, compression element 140 is a wire element. However, other types of compression elements are usable, such as rings, clamps, bars, fasteners, etc. The embodiment of compression element 140 shown in FIG. 9 includes two tangs 142 that are configured to be received in two slots 144 provided in, or attached to, the structure of tank 22. Compression element 140 further includes a loop 146 that is configured to be drawn down against the top surface of tank 22. For example, a fastener 148, such as a threaded fastener like a bolt, may be provided such that the shank of the fastener 148 is inserted through the opening in loop 146 and engages with a threaded hole 150 in tank 22. As fastener 148 is tightened into hole 150, the underside of the head of fastener 148 engages with wire element 140 to draw wire element 140 toward tank 22. Wire element 140 is constructed to have a generally bowed shape, such that drawing loop 146 of wire element 140 toward tank 22 with tangs 142 inserted in slots 144 causes a force to be exerted from the wire element 140 to the flange 132. This force against flange 132 causes the seal to be compressed and for an effective seal to be maintained between tank 22 and flange 132.

Figure 10:
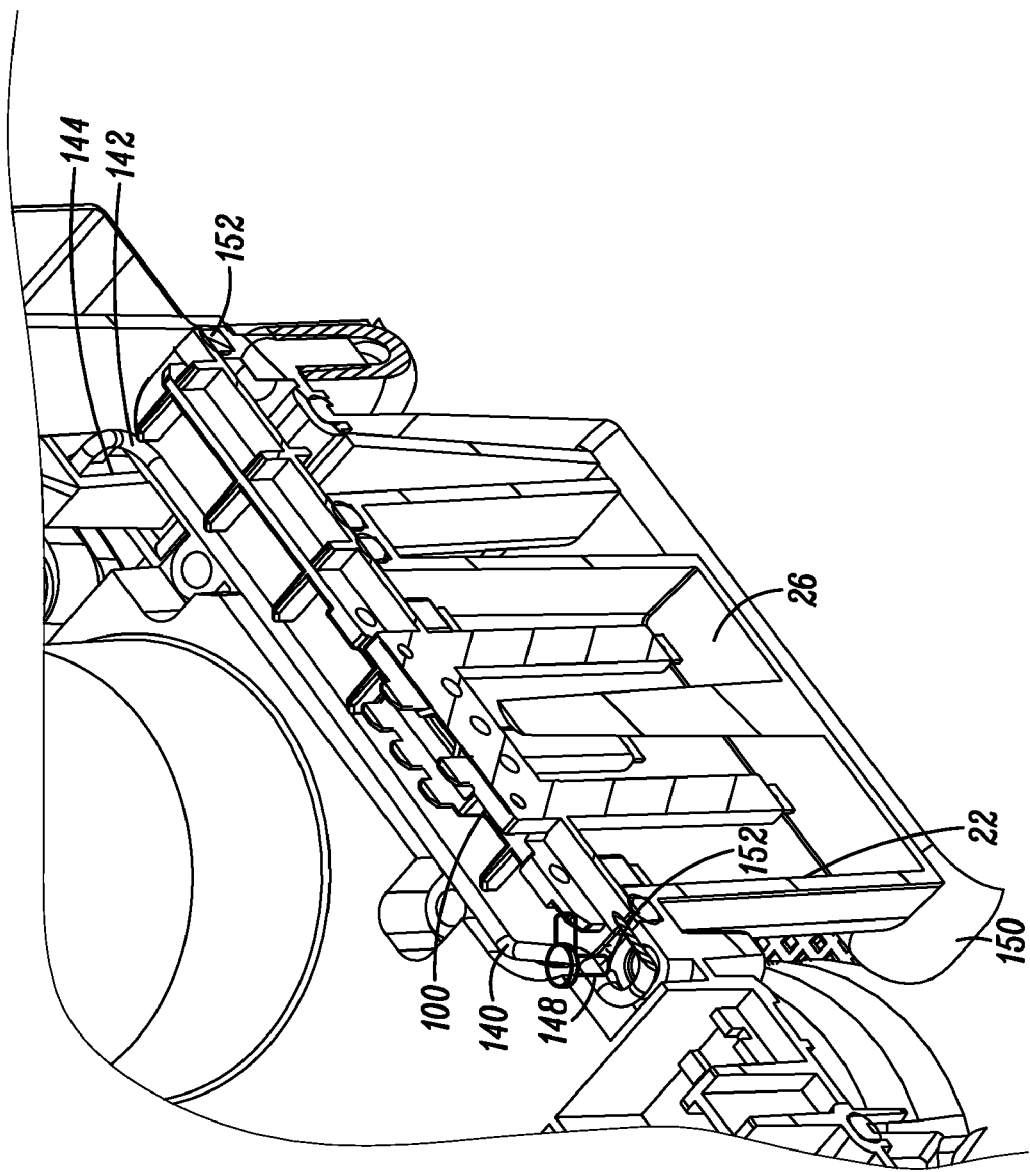
FIG. 10 is a perspective cross-sectional view of a water level sensor assembled to a tank and showing a seal between the tank and water level sensor.

FIG. 10 shows a cross-section through the isolated chamber portion 26 of the tank and water level sensor 100. Wire element 140 is shown in an assembled position with tangs 142 positioned within slots 144 and with bolt 148 assembled to threaded hole 150 in tank 22. The seal discussed above is visible in FIG. 10 and is labeled as seal 152. As can be seen in FIG. 10, the wire element 140 exerts a force against flange 132 which in turn exerts a force against seal 152, effecting a seal around water level sensor 100.

Figure 8:
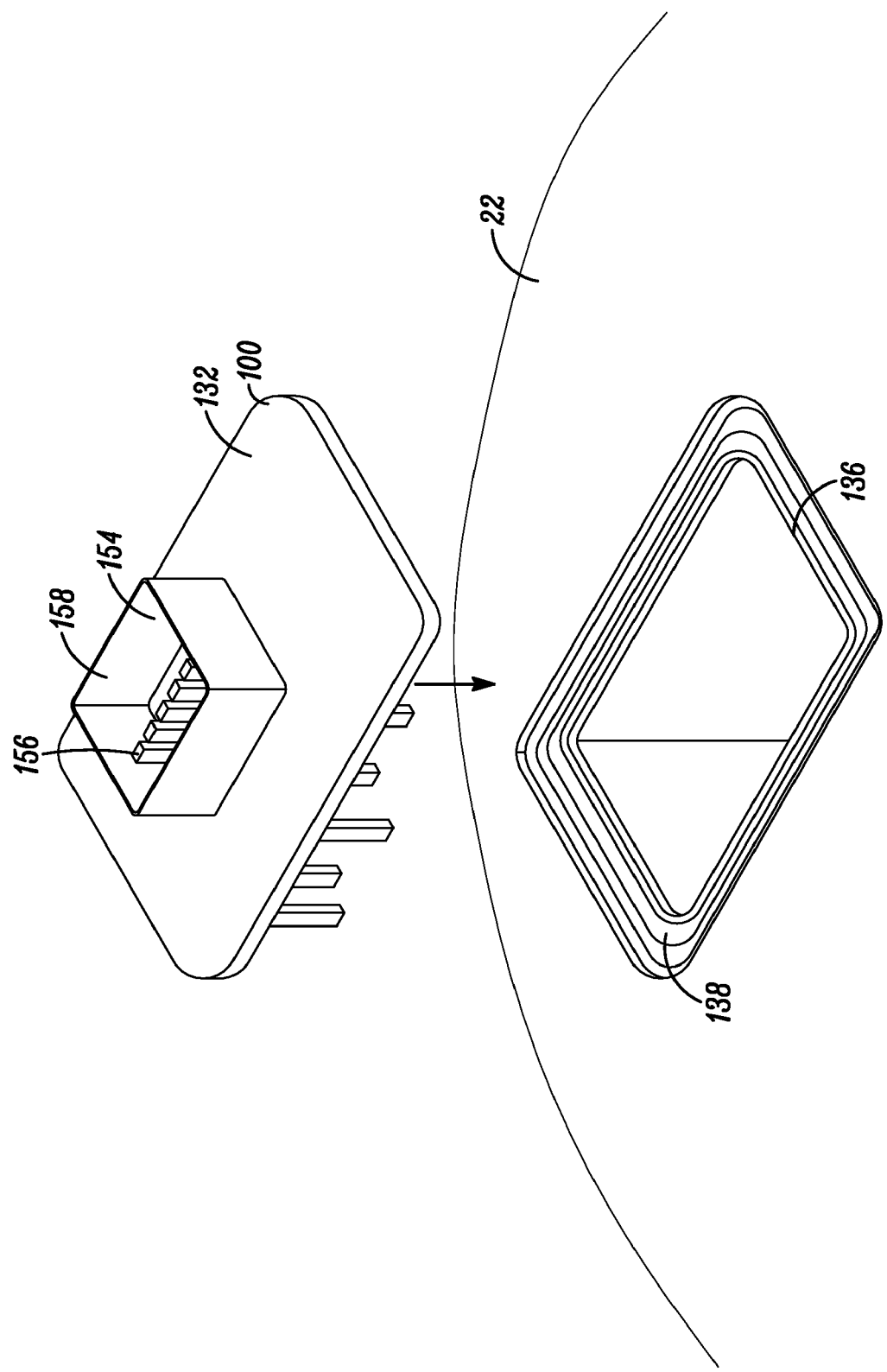
FIG. 8 is an exploded view of a water level sensor and an opening in a tank for receiving a water level sensor.

FIG. 8 shows an exploded view of water level sensor 100 and tank 22. As discussed above, tank 22 has an opening 136 in a top area that is configured to receive water level sensor 100. Tank 22 further includes seal groove 138. As shown in the embodiment of FIG. 8, water level sensor 100 provides a single electrical connector connection point 154. As shown in FIG. 5, all of the electrical conductors 118 are brought together on the side of the flange 132 that is away from the interior of tank 22. By bringing the electrical conductors 118 together in this way, it provides readily for a single electrical connection point. This single electrical connection point can be configured for use with a conventional electrical connector and a wiring assembly. As seen in the embodiment of FIG. 8, the connection point 154 includes a plurality of electrical pins 156 that are positioned within a well 158. In some embodiments, each electrical pin 156 is a region of a conductive element 118. There is generally one electrical pin 156 present in well 158 for each conductive element 118. In one embodiment, five electrical pins 156 are present in well 158. Well 158 protrudes from flange 132 and is configured to receive a terminal of an electrical connector. When such a terminal of an electrical connector is received within well 158, electrical contact is made with each of electrical pins 156 and the electrical connection is established through the terminal and wiring assembly to an appropriately configured controller for receiving information from the water level sensors. In some embodiments, well 158 is configured to receive a standardized electrical connector. For example, well 158 may be configured to receive a Molex brand connector, such as model number 35955-0620. In other embodiments, a well 158 is not present. However, in such a case, some other feature is generally present to promote the alignment and connection of an electrical connector to the electrical pins 156. For example, molded protrusions or other features may be present that prevent the electrical connector from being assembled incorrectly to the electrical pins 156.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

The above specification provides a complete description of the structure and use of the invention. Since many of the embodiments of the invention can be made without parting from the spirit and scope of the invention, the invention resides in the claims.

What is claimed is:

1. A water level sensor for a steam humidifier, the water level sensor comprising:
   (i) a plurality of conductive probes, the plurality of conductive probes including at least one common probe and a plurality of water level probes, each of the conductive probes being separated from each other conductive probe; and
   (ii) a non-conductive overmolding defining a flange that is configured to seal an opening in a tank of the steam humidifier, wherein each of the plurality of conductive probes includes an inwardly extending portion that extends from the flange and inwardly toward a tank of a steam humidifier, the non-conductive overmolding extending over and covering a majority of the inwardly extending portion of each of the conductive probes; and
   the non-conductive overmolding also defining an electrical connection point configured to receive an electrical connector for providing electrical connections to each of the conductive probes.

2. The water level sensor of claim 1, where the plurality of water level probes includes a low water level probe and a high water level probe.

3. The water level sensor of claim 2, where the plurality of water level probes further includes an overfill' water level probe.

4. The water level sensor of claim 1, where there are two or more common probes.

5. The water level sensor of claim 2, where there are two or more common probes and where one of the two or more common probes is operatively higher than the high water level probe.

6. The water level sensor of claim 1, where the electrical connection point includes a well that is configured to receive an electrical connector.

7. The water level sensor of claim 1, where the electrical connection point includes one or more pins configured to prevent an electrical connector from being installed incorrectly.

8. The water level sensor of claim 4, where at least one common probe is configured to be operatively at or below a low water level probe.

9. The water level sensor of claim 1, where the non-conductive overmolding covers more than about 90 percent of each conductive probe.

10. A steam humidifier comprising:
    (i) a tank for containing water and a heating element for heating the water in the tank to generate steam, the tank including a main chamber and an isolated chamber that is in fluid communication with the main chamber;
    (ii) a water level sensor having a plurality of conductive probes positioned in the isolated chamber, the water level sensor including:
       a plurality of conductive probes, the plurality of conductive probes including at least one common probe and a plurality of water level probes, each of the conductive probes being separated from each other conductive probe; and
       a non-conductive overmolding covering at least a portion of each of the conductive probes, the non-conductive overmolding defining:
          a flange configured to seal an opening in a tank of the steam humidifier; and
          an electrical connection point configured to receive an electrical connector for providing electrical connections to each of the conductive probes;

(iii) a seal between the flange of the water level sensor and the tank; and
(iv) a retainer configured to force the flange against the seal.

11. The steam humidifier of claim 10, where the plurality of water level probes includes a low water level probe and a high water level probe.

12. The steam humidifier of claim 11, where the plurality of water level probes further includes an overfull water level probe.

13. The steam humidifier of claim 10, where there are two or more common probes.

14. The steam humidifier of claim 11, where there are two or more common probes and where one of the two or more common probes is operatively higher than the high water level probe.

15. The steam humidifier of claim 10, where the electrical connection point comprises a well configured to receive an electrical connector.

16. The steam humidifier of claim 14, where at least one common probe is configured to be below the low water level probe.

17. The steam humidifier of claim 10, where the flange further includes reinforcing webs.

18. The steam humidifier of claim 10, where the retainer includes a wire element.

19. The steam humidifier of claim 18, where the wire element has a loop that is drawn down by one or more fasteners to force the flange against the seal.

20. The steam humidifier of claim 19, where the one or more fasteners are threaded fasteners.

21. The steam humidifier of claim 18, where the wire element includes a plurality of tangs.

22. The steam humidifier of claim 21, where the tangs are configured to be received by a receiving feature of the steam humidifier and where the wire element has a loop that is drawn down by a fastener to force the flange against the seal.

23. A steam humidifier comprising:
(i) a tank for holding water and a heating element for heating the water in the tank to generate steam, the tank including a main chamber and an isolated chamber that is in fluid communication with the main chamber;
(ii) a water level sensor having a plurality of conductive probes positioned in the isolated chamber, the water level sensor including:
a plurality of conductive probes, the plurality of conductive probes including at least one common probe and at least one water level probe, each of the conductive probes being separated from each other conductive probe; and
a flange configured to seal an opening in the tank of the steam humidifier, wherein each of the plurality of conductive probes extend inwardly from the flange and into the isolated chamber of the tank, at least one of the conductive probes extending into and being directly exposed to the water in the tank, the flange also including an electrical connection point configured to receive an electrical connector for providing electrical connections to each of the conductive probes;
(iii) a seal between the flange of the water level sensor and the tank; and
(iv) a retainer configured to maintain the flange against the seal.

* * * * *